US009069124B2

(12) United States Patent
Jakobsen et al.

(10) Patent No.: US 9,069,124 B2
(45) Date of Patent: Jun. 30, 2015

(54) DEVICE, A SYSTEM AND A METHOD OF ENCODING A POSITION OF AN OBJECT

(75) Inventors: Michael Linde Jakobsen, Roskilde (DK); Vagn Steen Gruner Hanson, Fakse (DK); Henrik Chresten Pedersen, Jyllinge (DK)

(73) Assignee: O-Net Wavetouch Limited, Hong Kong (HK)

( * ) Notice: Subject to any disclaimer, the term of this patent is extended or adjusted under 35 U.S.C. 154(b) by 720 days.

(21) Appl. No.: 13/384,110

(22) PCT Filed: Jul. 16, 2010

(86) PCT No.: PCT/DK2010/000110
§ 371 (c)(1),
(2), (4) Date: Mar. 27, 2012

(87) PCT Pub. No.: WO2011/006500
PCT Pub. Date: Jan. 20, 2011

(65) Prior Publication Data
US 2012/0170056 A1    Jul. 5, 2012

(30) Foreign Application Priority Data

Jul. 16, 2009   (DK) .................................. 2009 70065

(51) Int. Cl.
*G01B 11/00*    (2006.01)
*G02B 5/04*    (2006.01)
(Continued)

(52) U.S. Cl.
CPC .............. *G02B 5/045* (2013.01); *G02B 6/0016* (2013.01); *G06F 3/0428* (2013.01)

(58) Field of Classification Search
CPC ................. G02F 1/13338; G02F 2001/13312;
G02F 1/1303; G02F 1/133512; G02F 1/133514; G02F 1/133526; G02F 1/13394; G02F 1/13439; G02F 1/1345; G02F 1/1354; G02F 1/1362; G02F 1/136286; G02F 2201/38
See application file for complete search history.

(56) References Cited

U.S. PATENT DOCUMENTS 5,854,450 A    12/1998 Kent
7,133,032 B2 *  11/2006 Cok .............................. 345/175
(Continued)

FOREIGN PATENT DOCUMENTS

CH        656731        7/1986
GB     2131544 A        6/1984
(Continued)

*Primary Examiner* — Michael P Stafira
(74) *Attorney, Agent, or Firm* — Hamilton, Brook, Smith & Reynolds, P.C.

(57) ABSTRACT

The present invention relates to a device for encoding a position of an object, comprising a first light source; a first collimating element adapted to form first collimated light from the first light source; a carrier adapted to guide light and comprising a first primary light redirecting structure and a second primary light redirecting structure; and a detector device for encoding the position of an object with respect to an active area of an encoding plane; wherein the first primary light redirecting structure is adapted to redirect at least a part of a first light beam through the active area into the second primary light redirecting structure; and wherein the second primary light redirecting structure is adapted to redirect light received from the first primary light redirecting structure onto the detector device. Thereby is achieved that a collimated light beam is propagated along the carrier and from the carrier into the active area via the first primary light redirecting means. The collimated light ensures a controlled part of the carrier is utilized for the propagation of the collimated light.

26 Claims, 11 Drawing Sheets

(51) Int. Cl.
*G06F 3/042* (2006.01)
*F21V 8/00* (2006.01)

(56) References Cited

U.S. PATENT DOCUMENTS

2002/0175901 A1 11/2002 Gettemy
2004/0201579 A1 10/2004 Graham
2004/0212603 A1* 10/2004 Cok .............................. 345/175
2008/0266266 A1* 10/2008 Kent et al. ..................... 345/173
2008/0273019 A1* 11/2008 Deane ........................... 345/176
2010/0201637 A1* 8/2010 Herne et al. .................. 345/173

FOREIGN PATENT DOCUMENTS

| | | |
|---|---|---|
| JP | 10-162698 | 6/1998 |
| JP | 11-119912 | 4/1999 |
| JP | 2004-295644 | 10/2004 |
| JP | 2008-530641 | 8/2008 |

* cited by examiner

DEVICE, A SYSTEM AND A METHOD OF ENCODING A POSITION OF AN OBJECT

CROSS-REFERENCE TO RELATED APPLICATIONS

The present application is the national stage of International Application No. PCT/DK2010/000110, filed on Jul. 16, 2010, which claims the benefit of PA 2009 70065, filed on Jul. 16, 2009, the contents of all of which are hereby incorporated by reference.

The invention relates to a device for encoding a position of an object. The invention further relates to a corresponding system and a method.

Prior art touch pads may be imprecise because the light being guided outside the area of interrogation (active area) may be disturbed by an object such as a finger. Thereby, a problem of the prior art touch pads is that they are prone to false readings due to such disturbances of the light outside the active area.

An object of the invention is to solve the abovementioned problem.

Another object of the invention is to enable manufacturing simplicity of the touch pad.

The object of the invention is achieved by a device for encoding a position of an object, comprising a first light source; a first collimating element adapted to form first collimated light from the first light source; a carrier adapted to guide light and comprising a first primary light redirecting structure and a second primary light redirecting structure; and a detector device for encoding the position of an object with respect to an active area of an encoding plane; wherein the first primary light redirecting structure is adapted to redirect at least a part of a first light beam through the active area into the second primary light redirecting structure; and wherein the second primary light redirecting structure is adapted to redirect light received from the first primary light redirecting structure onto the detector device.

Thereby is achieved that a collimated light beam is propagated along the carrier and from the carrier into the active area via the first primary light redirecting means. The collimated light ensures a controlled part of the carrier is utilized for the propagation of the collimated light.

Additional embodiments and advantages are disclosed below in the detailed description and in the claims.

BRIEF DESCRIPTION OF THE DRAWINGS

The invention will now be described more fully below with reference to the drawings, in which.

DETAILED DESCRIPTION

Figure 1:
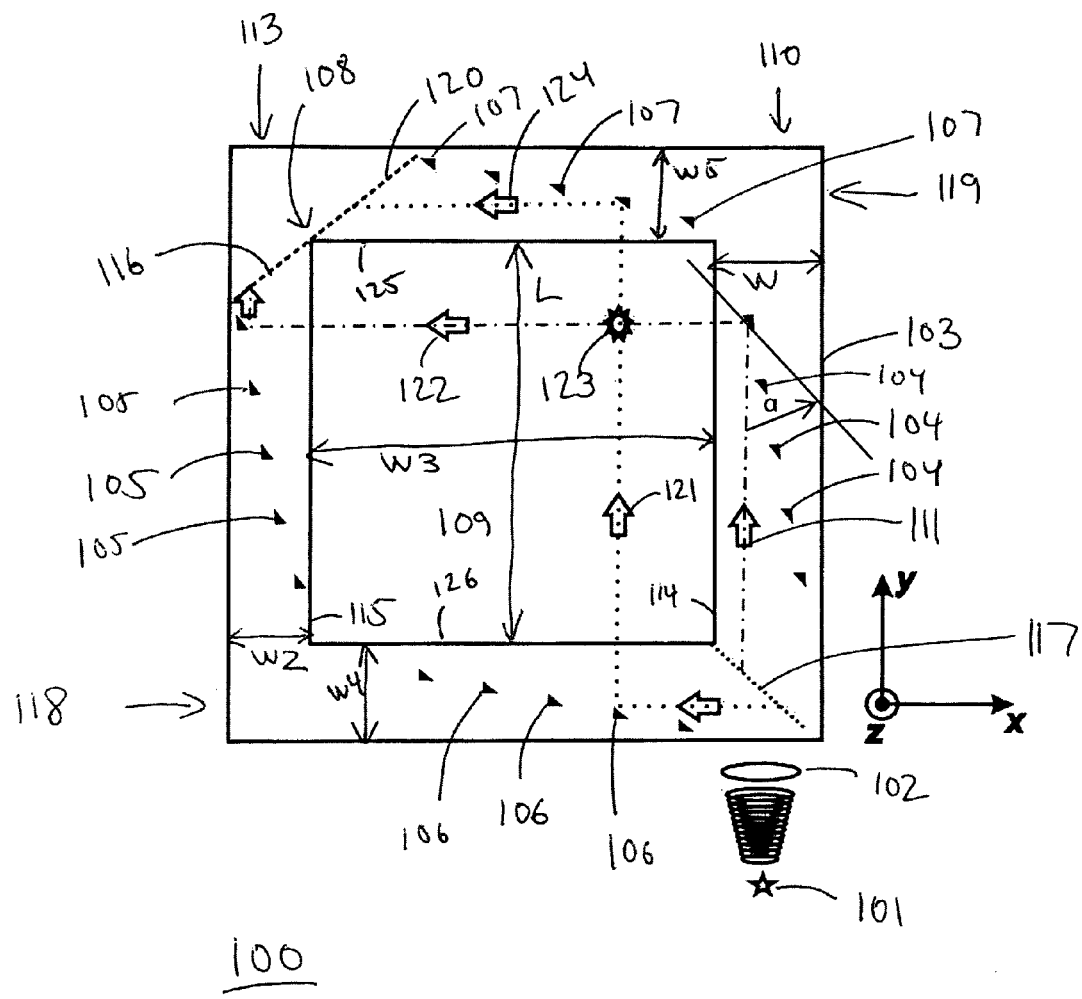
FIG. 1 shows a device for encoding a position of an object comprising light redirecting means formed as prisms.

FIG. 1 shows an embodiment of a device 100 for encoding a position of an object. The device 100 comprises a light source 101. The light source 101 may, for example, be a Light Emitting Diode (LED) or an incandescent bulb or a laser or a Vertical-cavity surface-emitting laser (VCSEL) or an organic light emitting diode (OLED) or the like. Further, the device may comprise a collimating element 102 such as a collimating lens or any other optical collimator.

The device 100 may further comprise a carrier 103. The carrier 103 may, for example, comprise a first optical waveguide 110 and a second optical waveguide 113 for guiding light. Additionally, the carrier 103 may comprise a first primary light redirecting structure 104 and a second primary light redirecting structure 105. The light redirecting structures 104, 105 may, for example, be formed in the first 110 and second 113 optical waveguides, respectively.

Additionally, the device 100 may further comprise an active area 109. The active area 109 may, for example, be formed by air or as an optical slab waveguide e.g. made in a polymer such as acrylic glass or silica glass.

Alternatively, the active area 109 may be made in any other medium enabling passage and/or guidance of light.

The device 100 additionally comprises a detector 108. For example, the detector may be a CMOS array or a CCD array comprising a number of pixels, e.g. the detector 108 may comprise a 256 pixel linear CMOS array. The detector may therefore be able to register a light intensity over the number of pixels.

Figure 4:
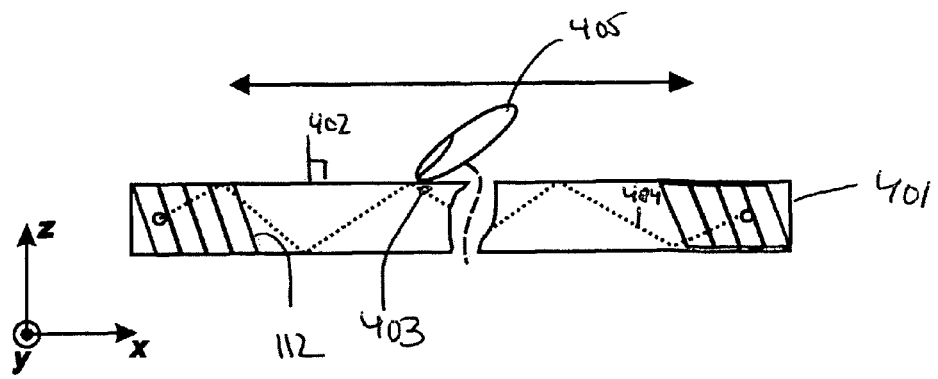
FIG. 4 shows a device for encoding a position of an object comprising the carrier in-line with the active area and light redirecting structures formed as prisms.

In an embodiment as shown in FIG. 4, the carrier 103 and the active area are contained in the same plane 401 (e.g. the X-Y-plane of FIG. 1) and the carrier 103 encloses the active area 109 e.g. by forming a square or other geometrical figure (such as a rectangle or a circle) enclosing the active area 109 as shown in FIG. 1.

When the carrier 103 and the active area 109 are contained in the same plane and the carrier 103 encloses the active area 109, then the active area 109 may be air or an optical slab waveguide made of a light guiding material such as silica glass or the like as disclosed above.

Figure 5:
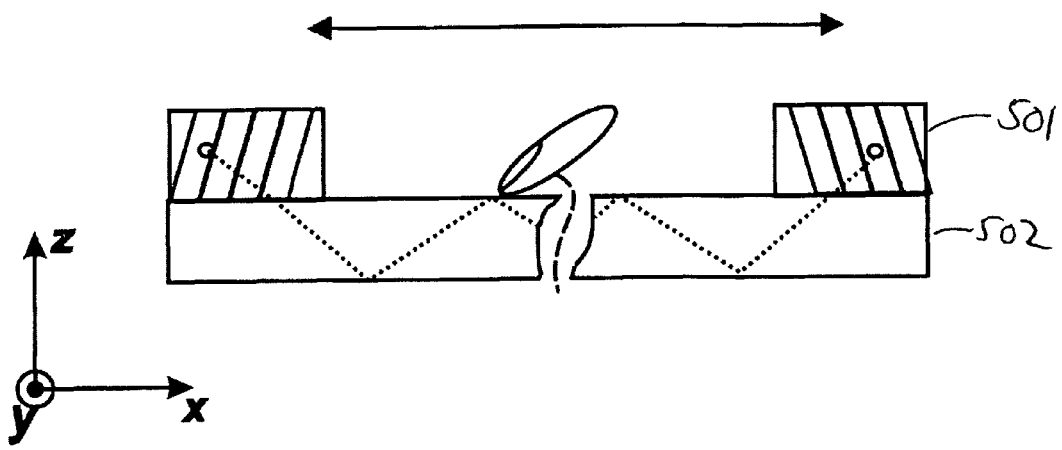
FIG. 5 shows a device for encoding a position of an object comprising the carrier above the active area and light redirecting structures formed as prisms.

In an embodiment as shown in FIG. 5, the carrier 103 may be contained in a first X-Y-plane 501 above a second plane 502 containing the active area 109.

Figure 6:
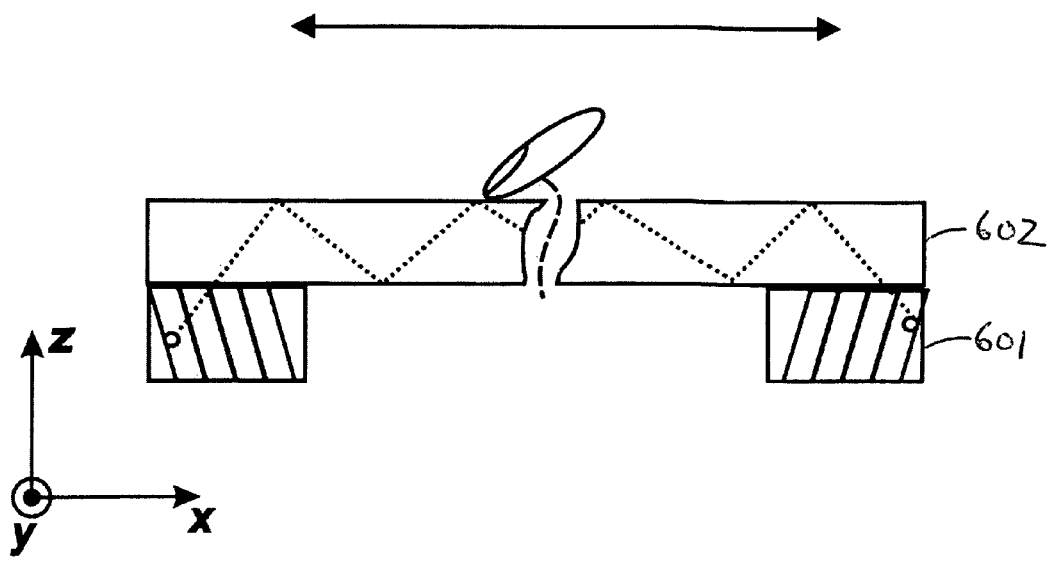
FIG. 6 shows a device for encoding a position of an object comprising the carrier below the active area and light redirecting structures formed as prisms.

In an embodiment as shown in FIG. 6, the carrier 103 may be contained in a first X-Y-plane 601 below a second plane 602 containing the active area 109.

When the carrier 103 and the active area 109 are contained in different planes as illustrated in for example FIGS. 5 and 6, then the active area 109 may be an optical slab waveguide made of a light guiding material such as silica glass or the like as disclosed above. Further, when the carrier 103 and the active area 109 are contained in different planes, then the carrier 103 may be placed around the edge of the active area 109 in the other plane 501, 601.

In the embodiment of FIG. 1, the collimating element 102 may be comprised in the carrier 103. Alternatively, the collimating element 102 may be a collimating lens external with respect to the carrier 103. The collimated light from the collimating element 103 may be coupled into the optical waveguide of the carrier 103 such that the collimated light subsequently may be guided by the first optical waveguide 110. For example, the collimated light may be guided by total internal reflection in the first optical waveguide 110.

In an embodiment, the collimated light is coupled into the carrier 103 via the collimating element 102 in a first part 110 of the carrier 103. The first part of the carrier 103 may, for example, be a first side of the square carrier illustrated in FIG. 1. As described above, the optical waveguide forming the first side 110 of the square carrier 103 may contain the first primary light redirecting structure 104.

The first primary light redirecting structure 104 may, for example, comprise a number of prisms, e.g. a plurality of prisms such as five prisms. The prisms may be formed in the first side of the carrier 103 by casting, punching, drilling, etching, etc.

The prisms may have an isosceles triangular shape and may thus provide a plane surface 112 in the X-Z-plane facing the collimated light beam. Further, in the Z-direction in FIG. 1, the prisms 104 may extend all the way through the carrier 103. Alternatively, the prisms may extend partly through the carrier 103 in the Z-direction, e.g. 90% through the Z-direction of the carrier 103. The prisms may be hollow (e.g. filled with air) or filled with a fluid (such as water) or a solid (such as a polymer), however, the refractive index of the filling material must be smaller than the refractive index of the optical waveguide 110 of the first side of the carrier 103. Thus, in the example where the optical waveguide 110 is made from an acrylic glass, the refractive index of the filling material must be smaller than the refractive index of the acrylic optical waveguide i.e. 1.47 in order to facilitate close to total reflection into the active area 109. Alternatively, the prisms may comprise embedded reflectors or prism structures having a reflective coating.

Generally, the refractive index of the filling material of a prism should be smaller than the refractive index of the optical waveguide in which the prism is formed.

In the X-direction of FIG. 1, the prisms of the first primary light redirecting structure 104 are placed such as to substantially cover the width W of the optical waveguide 110 in the X-direction in a substantial continuous manner i.e. substantially all the collimated light (e.g. 90%) coupled into the optical waveguide 110 will interact with the prisms 104 (neglecting optical loss in the optical waveguide 110).

In the Y-direction of FIG. 1, the prisms are placed such as to substantially cover the length L of the active area in the Y-direction in a discrete manner i.e. the prisms are placed such that some points along the Y-direction in the active area 109 will be reached by light reflected from the first primary light redirecting structure 104 and some points in along the Y-direction in the active area 109 will not be reached by light reflected from the first primary light redirecting structure.

As seen in FIG. 1, the prisms 104 are arranged to yield an angle a with respect to the collimated light beam 111 being guided in the optical waveguide 110 in the X-Y-plane of FIG. 1. In an embodiment, the angle a is chosen from in the range 30°-60°, for example the angle a is chosen to be 45° (=π/4 radians).

Figure 7:
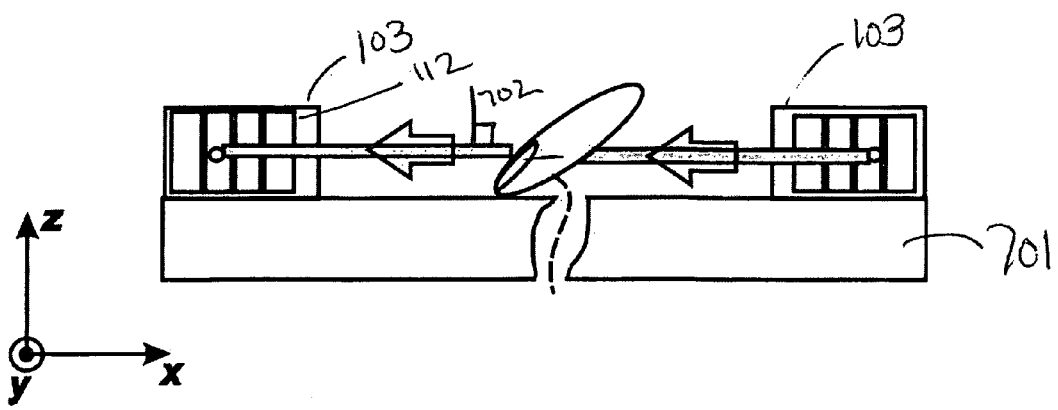
FIG. 7 shows a device for encoding a position of an object comprising the carrier in-line with the active area formed in air and light redirecting structures formed as prisms.

If the active area 109 is formed by air i.e. with a refractive index of approximately 1, then the planar surface 112 of the prisms facing the collimated light beam is perpendicular to the plane of the active area 109 i.e. the X-Y-plane. In FIG. 7, the carrier 103 is placed on a slab 701 e.g. a plexi-glass slab. However, such a slab is optional when the active area is formed by air. For example, an embodiment may comprise the carrier 103 and the active area formed by air without the slab 701. An advantage of the embodiment in which the active area is formed by air is that it provides total or substantially total blockage of light in the point of contact. Thereby, detection of a change in light detected at the detector 108 may be improved.

The collimated light guided in the optical waveguide 110 is reflected at least partly by the prisms 104 where the angle between the collimated light beam and the planar surface of the prism is 45° and the angle between the planar surface 112 and the normal 702 to the active area plane is 0°. Thereby, the reflected light is coupled from the optical waveguide 110 into the active area 109 and the light is coupled into the active area 109 substantially perpendicular to the normal 702 of the active area plane i.e. substantially parallel to the plane of the active area.

When the active area 109 is formed by air, the light is coupled into the active area via a waveguide-air interface 114 and the light coupled into the active area will be guided in free air and thus travel in a substantial straight line to the other surface of the active area, from where the light is coupled into a second part 113 of the carrier 103, i.e. a second optical waveguide 113 of the carrier 103, via an air-waveguide interface 115.

If the active area 109 is formed by a slab waveguide such as an acrylic glass plate e.g. with a refractive index of approximately 1.49, then the planar surface 112 of the prisms facing the collimated light beam form an angle different from 0° with a normal 402 to the plane of the active area 109 i.e. the X-Y-plane as e.g. seen in FIG. 4. For example, the angle between the planar surface 112 of the prism and the normal 402 to the plane of the active area 109 may be selected in the range from 70°-89°, for example, the angle may be selected to 75° in order to ensure a number of up- and down-bounces of the light in the slab waveguide 109. The more bounces i.e. total internal reflections, the larger the sensitivity of the slab waveguide active area because the more possible points of contact where the light in the slab waveguide may be disturbed by an object such as an finger and whereby the intensity of the light reaching the detector may be changed as described below. The areas of the surface of the waveguide where the light hits the active area 109 provides areas of maximum sensitivity. Due to the discreteness in the Y-direction of the light transmitted between the first and second primary light redirecting structures 104, 105 and the discreteness in the X-direction of the light transmitted between the first and second secondary light redirecting structures 106, 107 (when the light redirecting structures are formed by prisms), areas on a surface of the waveguide may be provided in which both directions (X and Y) yield high sensitivity, namely where the areas of high sensitivity in the X- and Y-direction coincides. Areas of coincidence may be established by proper combination of thickness of the slab waveguide and the angle at which the light propagates within the slab waveguide.

In an embodiment, the areas of coincidence may coincide with alpha-numeric symbols of a keyboard thereby establishing a alpha-numeric touch-pad.

The collimated light guided in the first optical waveguide 110 is reflected at least partly by the prisms 104 where the angle between the collimated light beam and the planar surface of the prism is approximately 45° and the angle between the planar surface and the active area plane is different from 90° e.g. 75°. Thereby, the reflected light is coupled from the optical waveguide 110 into the active area 109.

When the active area is formed by a slab waveguide such as an acrylic slab waveguide, the light is coupled into the active area via a waveguide-waveguide interface 114 and the light coupled into the active area will be guided in the slab waveguide via total internal reflection to the other surface of the active area, from where the light is coupled into the second optical waveguide 113 of the carrier 103 via a waveguide-waveguide interface 115.

In an embodiment, the carrier 103 and the active area 109 may be formed in the same material such as acrylic glass or silica glass. Alternatively, the carrier 103 may be formed in one material such as acrylic glass or silica glass and the active area 109 may be formed in a second material such as air or Ge-doped silica glass. The carrier 103 may have a refractive index $n_{carrier}>1$, for example in the range from about 1.44 to about 1.56.

The second optical waveguide 113 of the carrier 103 may, for example, be a second side of the square carrier illustrated in FIG. 1. For example, the second optical waveguide 113 may be a second side, opposite to the first part 110 of the carrier 103.

The optical waveguide forming the second side 110 of the square carrier 103 may contain the second primary light redirecting structure 105.

The second primary light redirecting structure 105 may, for example, comprise a number of prisms, e.g. a plurality of prisms such as five prisms. The prisms may be formed in the first side of the carrier 103 by casting, punching, drilling, etching, etc.

The prisms 105 of the second part 113 may be similar to the prisms of the first part 110 i.e. have a isosceles triangular shape and may thus provide a plane surface 112 in the Y-Z-plane facing the light coupled in from the active are 109. Further, in the Z-direction in FIG. 1, the prisms 105 may extend all the way through the carrier 103. Alternatively, the prisms may extend partly through the carrier 103 in the Z-direction, e.g. 90% through the Z-direction of the carrier 103. The prisms 105 may be hollow (e.g. filled with air) or filled with a fluid (such as water) or a solid (such as a polymer), however, the refractive index of the filling material and thus the prisms must be smaller than the refractive index of the optical waveguide of the second side 113 of the carrier 103 e.g. the refractive index of the filling material must be smaller than the refractive index of the acrylic optical waveguide i.e. 1.47. Alternatively, the prisms may comprise embedded reflectors or prism structures having a reflective coating.

In the X-direction of FIG. 1, the prisms 105 are placed such as to substantially cover the width W2 of the optical waveguide 113 in the X-direction in a continuous manner i.e. the light reflected from the prisms 105 is able to cover substantially all of the first part 116 of the detector 108.

In the Y-direction of FIG. 1, the prisms 105 are placed such as to substantially cover the length L of the active area in the Y-direction in a discrete manner and to match the positions of the prisms 104 of the first primary light redirecting structure of the carrier 103 in a one-to-one manner i.e. light reflected by a prism 104 is ensured to be able to reach a prism 105 (neglecting losses in the first 110 and second 113 waveguides and the active area 109 and the waveguide-active area interfaces 114, 115).

As seen in FIG. 1, the prisms 105 are arranged to yield an angle a with respect to the collimated light beam 111 being guided in the optical waveguide 110 in the X-Y-plane of FIG. 1. In an embodiment, the angle $\alpha$ is chosen from in the range 30°-60°, for example the angle $\alpha$ is chosen to be 45° (=$\pi/4$ radians).

If the active area 109 is formed by air i.e. with a refractive index of approximately 1, then the planar surface 112 of the prisms facing the light from the active area 109 forms an angle of 0° with a normal 702 to the plane of the active area 109 i.e. the X-Y-plane as e.g. seen in FIG. 7 i.e. the planar surface 112 of the prisms facing the collimated light beam is perpendicular to the plane of the active area 109.

The light received from the active area 109 is reflected at least partly by the prisms 105, where the angle between the received light beam and the planar surface of the prism 105 is approximately 45° and the angle between the planar surface 112 and the normal 702 to the active area plane is 0°. Thereby, the reflected light is guided from the prisms 105 via the second optical waveguide 113 to the first part 116 of the detector 108.

When the active area 109 is formed by air, the light is coupled from the active area into the second optical waveguide 113 via an air-waveguide interface 115 and the light coupled into the second optical waveguide 113 is guided via total internal reflection.

If the active area 109 is formed by a slab waveguide such as an acrylic glass plate e.g. with a refractive index of approximately 1.49, then the planar surface 112 of the prisms 105 facing the light received from the active area 109 forms an angle different from 0° with a normal 402 to the plane of the active area 109 i.e. the X-Y-plane as e.g. seen in FIG. 4. For example, the angle between the planar surface 112 of the prism 105 and the normal 402 to the plane of the active area 109 may be selected in the range from 70°-89°, for example, the angle may be selected to 75° in order to ensure a reflected beam from the prisms 105 which is substantially parallel to the active area plane.

Thereby, the light received from the active area is guided in the second optical waveguide 113 and the light is reflected at least partly by the prisms 105 where the angle between the received light beam and the planar surface of the prism 105 is 45° and the between the planar surface and a normal 402 to the active area plane is different from 0°. Thereby, the reflected light from the prisms 105 is guided to the first part 116 of the detector 108.

In an embodiment, the carrier 103 of the device 100 further comprises a beam splitter 117. Further, the carrier 103 may comprise a first secondary light redirecting structure 106 and a second secondary light redirecting structure 107.

The first secondary light redirecting structure 106 may be contained in a third side 118 of the carrier 103. For example, the third side 118 may contain a third optical waveguide 118 positioned between the first 110 and the second 113 optical waveguides and at a right angle to the first and second optical waveguides.

The second secondary light redirecting structure 107 may be contained in a fourth side 119 of the carrier 103. For example, the fourth side 119 may contain a fourth optical waveguide 119 positioned on the opposite side of the active area 109 as the third optical waveguide 118.

The first 106 and second 107 secondary light redirecting structures may be similar to the first 104 and second 105 primary light redirecting structures as disclosed above however rotated 180° with respect to the Z-axis.

The beam splitter 117 may be positioned at an angle of 45° with respect to the collimated light beam being coupled into the carrier 103 via the collimating element 102. Thus, the beam splitter is positioned such as to pass approximately 50% (3 dB) of the collimated light towards the first primary light redirecting structure 104 in the first optical waveguide and to reflect approximately 50% (3 dB) of the collimated light towards the first secondary light redirecting structure 106 in the third optical waveguide 118.

The collimated light passing the beam splitter 117 is guided via the first optical waveguide 110 and at least a part of the collimated light is reflected by the first primary light redirecting structure 104 to the active area 109. From the active area 109, at least a part of the light is coupled into the second optical waveguide 113 and at least a part of the light is reflected from the second primary light redirecting structure 105 and guided via the second optical waveguide 113 to the first part 116 of the detector 108, where at least a part of the light may be detected.

Similarly and by the same principles, the collimated light reflecting from the beam splitter 117 is guided via the third optical waveguide 118 and at least a part of the collimated light is reflected by the first secondary light redirecting structure 106 to the active area 109. From the active area 109, at least a part of the light is coupled into the fourth optical waveguide 119 and at least a part of the light is reflected from the second secondary light redirecting structure 107 and guided via the fourth optical waveguide 119 to a second part 120 of the detector 108, where at least a part of the light may be detected.

In an embodiment, a cylindrical lens (not shown) is formed in the second optical waveguide 113 in front of the first part 116 of the detector 108 in order to focus the light incident on the detector 108 from the second waveguide 113. Similarly, a cylindrical lens is formed in the fourth optical waveguide 119 in front of the second part 120 of the detector 108 in order to focus the light incident on the detector 108 from the fourth waveguide 119.

In an embodiment, the number of prisms in a light redirecting structure such as the first primary light redirecting structure may be determined by diffraction of the spatially restricted rays leaving an individual prism. Thus, from diffraction considerations, the maximal number of prisms in a light redirecting structure may be calculated by the formula $$\sqrt{\frac{L}{\lambda \cdot A}},$$

where $\lambda$ is the wavelength of the light in the optical waveguide, L is the length of the active area and A is a constant chosen from the range 3-10, for example A=10.

In an embodiment, the first and second primary light redirecting structures 104, 105 are formed in the first 110 and second 113 optical waveguides positioned perpendicular to the third 118 and fourth 119 optical waveguides containing the first 106 and second 107 secondary light redirecting structures respectively. Thereby, light transmitted from the first primary light redirecting structure 104 to the second primary light redirecting structure 105 may be substantially perpendicular (e.g. within 1°) to light transmitted from the first secondary light redirecting structure 106 to the second secondary light redirecting structure 107.

Figure 15:
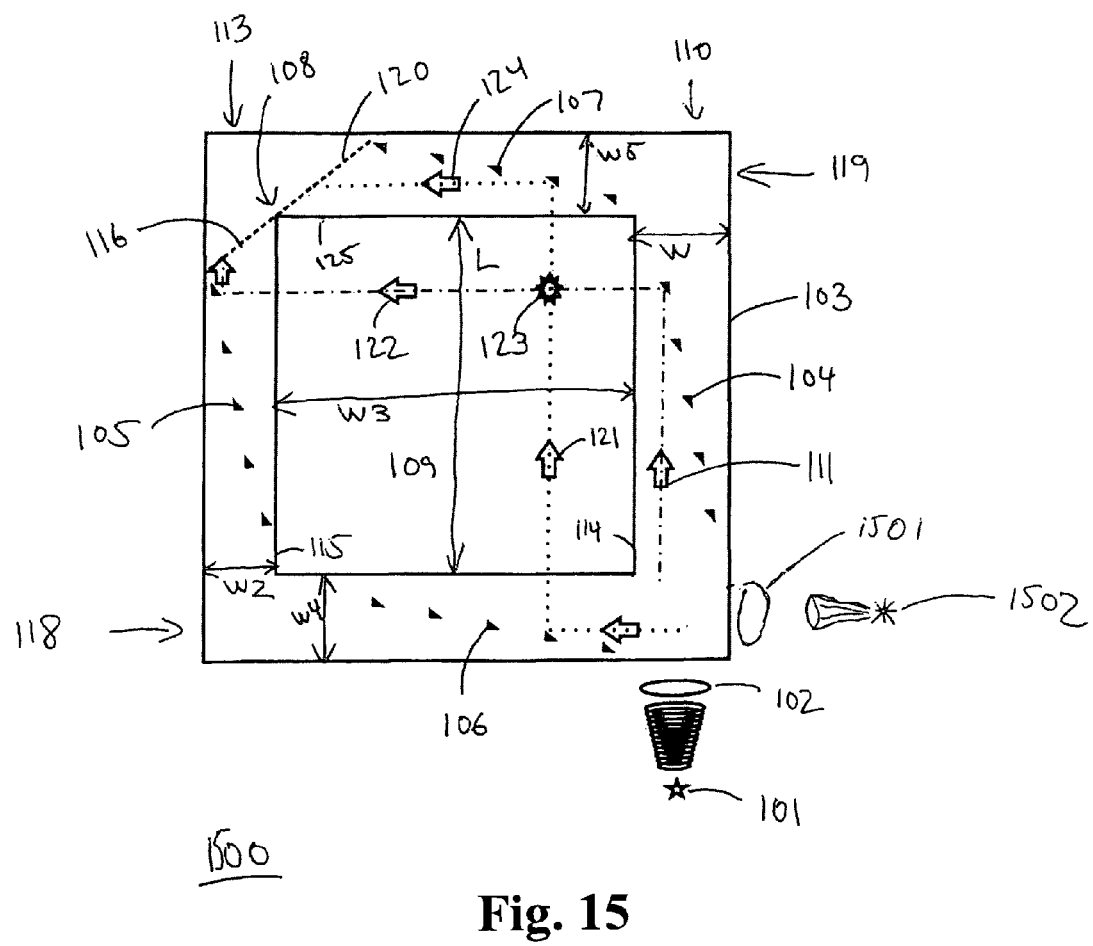
FIG. 15 shows an embodiment of a device comprising two light sources.

In an embodiment as shown in FIG. 15, the beam splitter may be substituted by a second light source 1502 and a second collimating element 1501, wherein the second light source 1502 is positioned at a 90° angle with respect to the first light source 101 such as to generate light at least a part of which propagates through the second collimating element 1501 and into the third optical waveguide 118.

Figure 2:
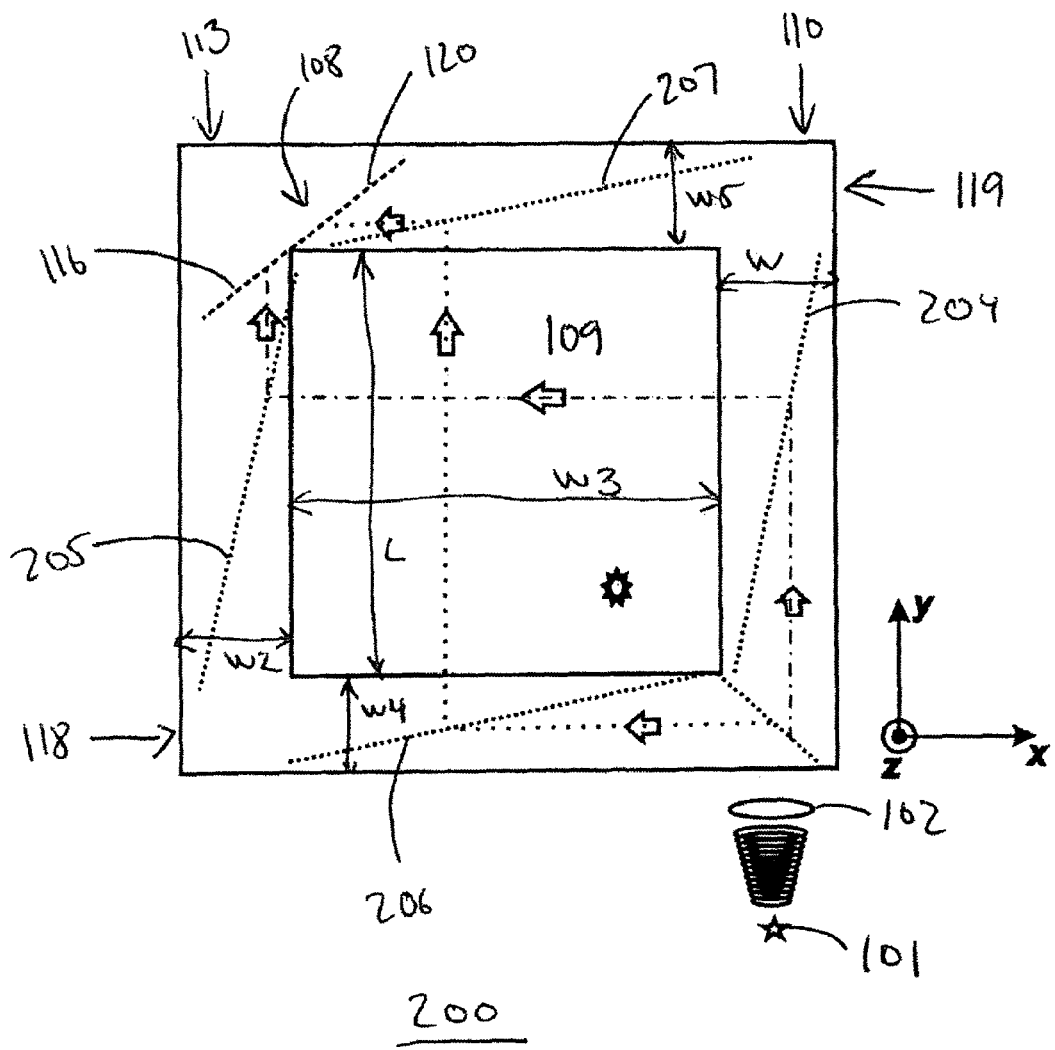
FIG. 2 shows a device for encoding a position of an object comprising light redirecting means formed as diffractive transmission gratings.

FIG. 2 shows an embodiment of a device 200 for encoding a position of an object. The device 200 may comprise all the technical features contained in the embodiment of FIG. 1 except the prisms 104-107. In the device 200, the first and second and third and fourth light redirecting structures are formed by a first 204 and a second 205 and a third 206 and a fourth 207 diffractive transmission structure.

The diffractive transmission structures 204, 206 are made such as to substantially cover the width W, W4 of the optical waveguide 110, 118 in the X-direction, Y-direction, respectively, in a substantially continuous manner i.e. substantially all the collimated light coupled into the optical waveguide 110, 118 will interact with the diffractive transmission structures 204, 206, respectively (neglecting optical loss in the optical waveguide).

The diffractive transmission structures 204, 206 are further made such as to substantially cover the length L, W3 of the active area in the Y-direction, X-direction, respectively, in a substantially continuous manner i.e. the diffractive transmission structures 204, 206 are placed such that substantially all points along the Y-direction, X-direction, respectively, in the active area 109 will be reached by light reflected from the first primary 204, respectively secondary 206, light redirecting structure. Thereby, the diffractive transmission structures 204, 206 provide a substantial continuous sensitivity across the active area 109.

The diffractive transmission structures 205, 207 of FIG. 2 are placed such as to substantially cover the width W2, W5 of the optical waveguide 113, 119 in the X-direction, Y-direction, respectively, in a continuous manner i.e. the light reflected from the diffractive transmission structures 205, 207 is able to cover substantially all of the first part 116, respectively second part 120, of the detector 108.

The diffractive transmission structures 205, 207 are further made such as to substantially cover the length L, W3 of the active area in the Y-direction, respectively X-direction, in a continuous manner and to match the positions of the diffractive transmission structure 204, 206, respectively of the first, respectively second, primary light redirecting structure of the carrier 103 in a one-to-one manner i.e. light reflected by the first primary/secondary light redirecting structure is ensured to be able to reach a diffractive transmission structure 205, 207, respectively (neglecting losses in the waveguides and the active area and the waveguide-active area interfaces).

Figure 3:
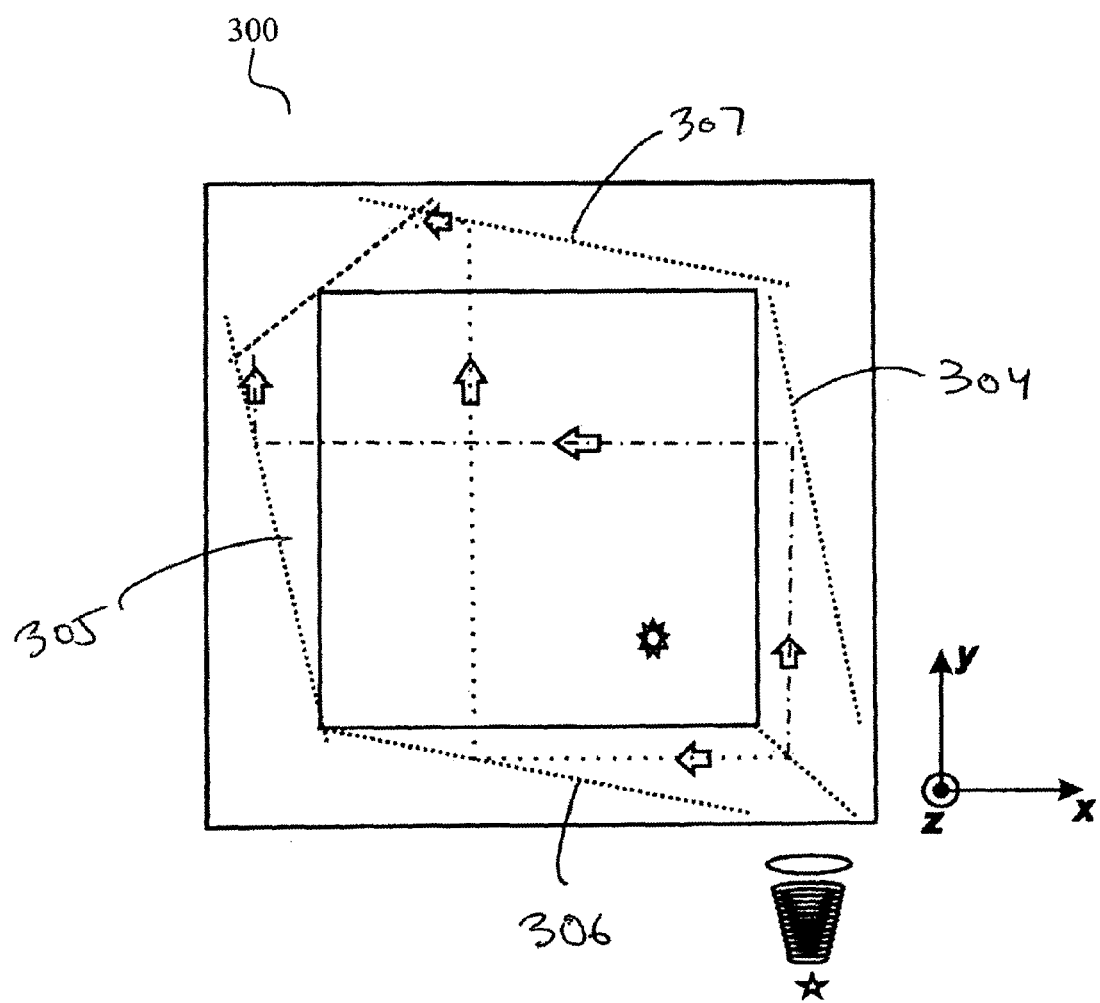
FIG. 3 shows a device for encoding a position of an object comprising light redirecting structures formed as diffractive reflection gratings.

FIG. 3 shows an embodiment of a device 300 for encoding a position of an object. The device 300 may comprise all the technical features contained in the embodiment of FIG. 1 except the prisms 104-107. In the device 300 the first and second and third and fourth light redirecting structures are formed by a first 304 and a second 305 and a third 306 and a fourth 307 diffractive reflection structure.

In an embodiment, the light redirecting structures of FIG. 1 and/or FIG. 2 and/or FIG. 3 may be of the same type e.g. all light redirecting structures may be prisms or diffractive transmission structures or diffractive reflection structures.

In an embodiment, the light redirecting structures of FIG. 1 and/or FIG. 2 and/or FIG. 3 may be of different type e.g. the first and second primary light redirecting structures may be prisms and the first and second secondary light redirecting structures may be diffractive transmission structures or the first and second primary light redirecting structures may be diffractive transmission structures and the first and second secondary light redirecting structures may be diffractive reflection structures etc.

In an embodiment, the diffractive transmission structures and/or the diffractive reflection structures may be gratings and/or holograms and/or computer generated holograms.

Figure 12:
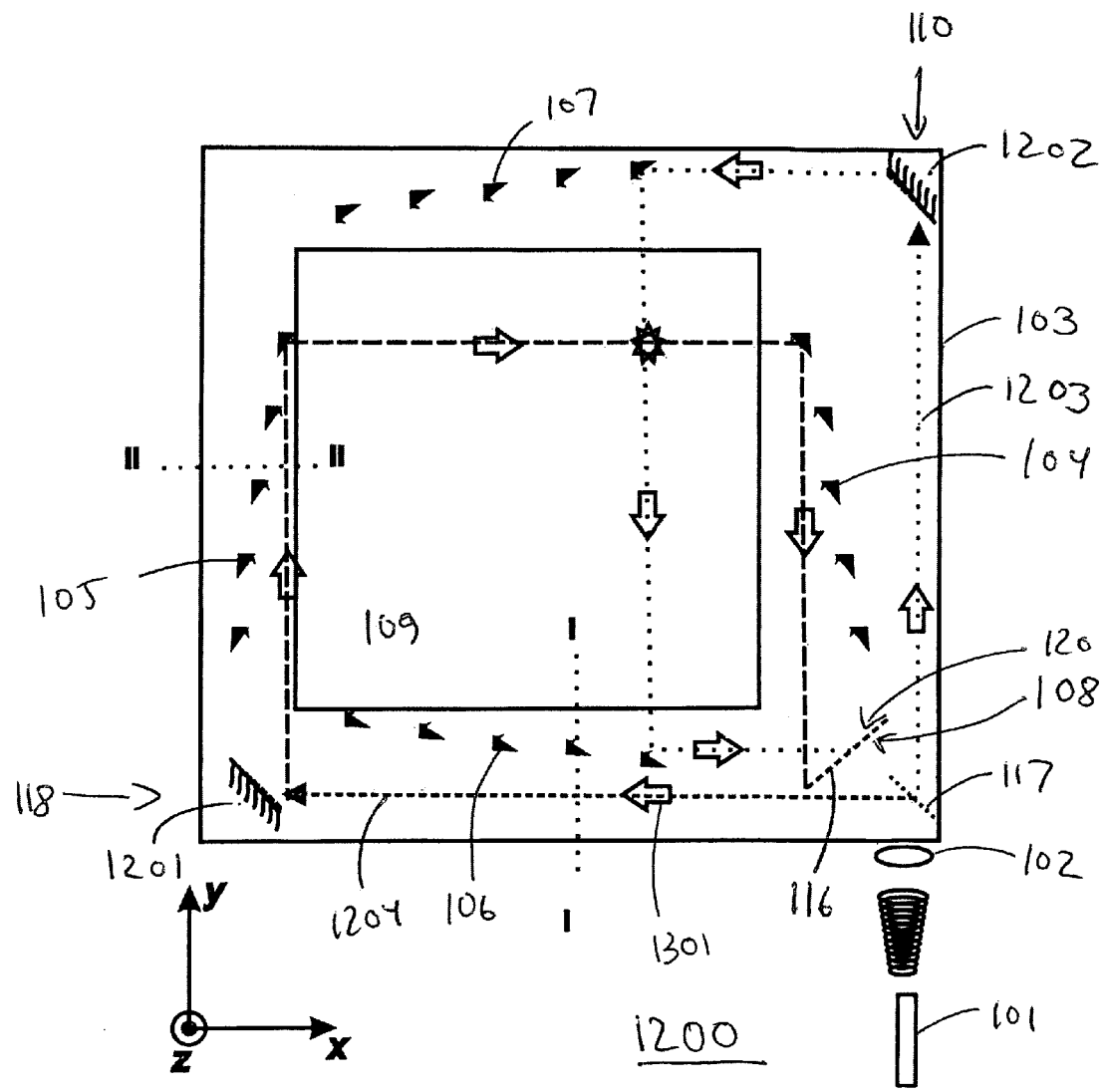
FIG. 12 shows a device for encoding a position of an object comprising two mirrors and the detector positioned in proximity to the beam splitter.

FIG. 12 shows an embodiment of a device 1200 for encoding a position of an object. The device 1200 may comprise all the technical features contained in the embodiment of FIG. 1 and/or FIG. 2 and/or FIG. 3.

In the device 1200, the first 110 and third 118 optical waveguides are wider than the first and third optical waveguides of device 100 such as to provide a first part containing the first primary 104 and secondary 106 light redirecting structures, respectively, and a second part enabling guidance of light 1203, 1204 parallel to the first primary and secondary light redirecting structures 104, 106.

The beam splitter 117 is formed in the second part of the first 110 and third 118 optical waveguides near the collimating element 102. Further, the beam splitter 117 may be positioned at an angle of 45° with respect to the collimated light beam being coupled into the carrier 103 via the collimating element 102. Thus, the beam splitter is positioned such as to pass approximately 50% (3 dB) of the collimated light towards a second mirror 1202 in the second part of the first optical waveguide 110 and to reflect approximately 50% (3 dB) of the collimated light towards a first mirror 1201 in the second part of the third optical waveguide 118. By guiding the light from the beam splitter 117 in the second part of the first 110 respectively third 118 optical waveguide enables the light to propagate undisturbed by the prisms 104, 106, respectively (neglecting loss in the optical waveguides 110, 118) to the mirrors 1201, 1202, The detector 108 may be formed in the first part of the first 110 and third 118 optical waveguides near the active area 109. The detector 108 may be formed such as to detect light reflected from the first primary and secondary light redirecting structures 104, 106.

The first mirror 1201 is formed in the second part of the third optical waveguide 118 and such as to reflect light from the beam splitter 117 at an angle of 90° onto the second primary light redirecting structure 105.

The second mirror 1202 is formed in the second part of the first optical waveguide 110 and such as to reflect light from the beam splitter 117 at an angle of 90° onto the second secondary light redirecting structure 107.

Light incident on the second primary light redirecting structure 105 from the first mirror 1201 may be reflected approximately 90° into the active area 109. Light passing the active area 109 from the second primary light redirecting structure 105 may be coupled into the first part of the first optical waveguide 110. The light coupled into the first part of the first optical waveguide 110 may be reflected approximately 90° by the first primary light redirecting structure 104 and into the first part 116 of the detector 108.

Light incident on the second secondary light redirecting structure 107 from the second mirror 1202 may be reflected approximately 90° into the active area 109. Light passing the active area 109 from the second secondary light redirecting structure 107 may be coupled into the first part of the third optical waveguide 118. The light coupled into the first part of the third optical waveguide 118 may be reflected approximately 90° by the first secondary light redirecting structure 106 and into the second part 120 of the detector 108.

Thus, the device 1200 provides a single-ended device i.e. a device in which the light source 101 and the detector 108 are formed in the same part/corner of the device 1200 thereby enabling easy electrical access to the two features. As disclosed above, the light redirecting structures may be prisms, diffractive transmission gratings and/or diffractive reflection gratings.

Figure 13:
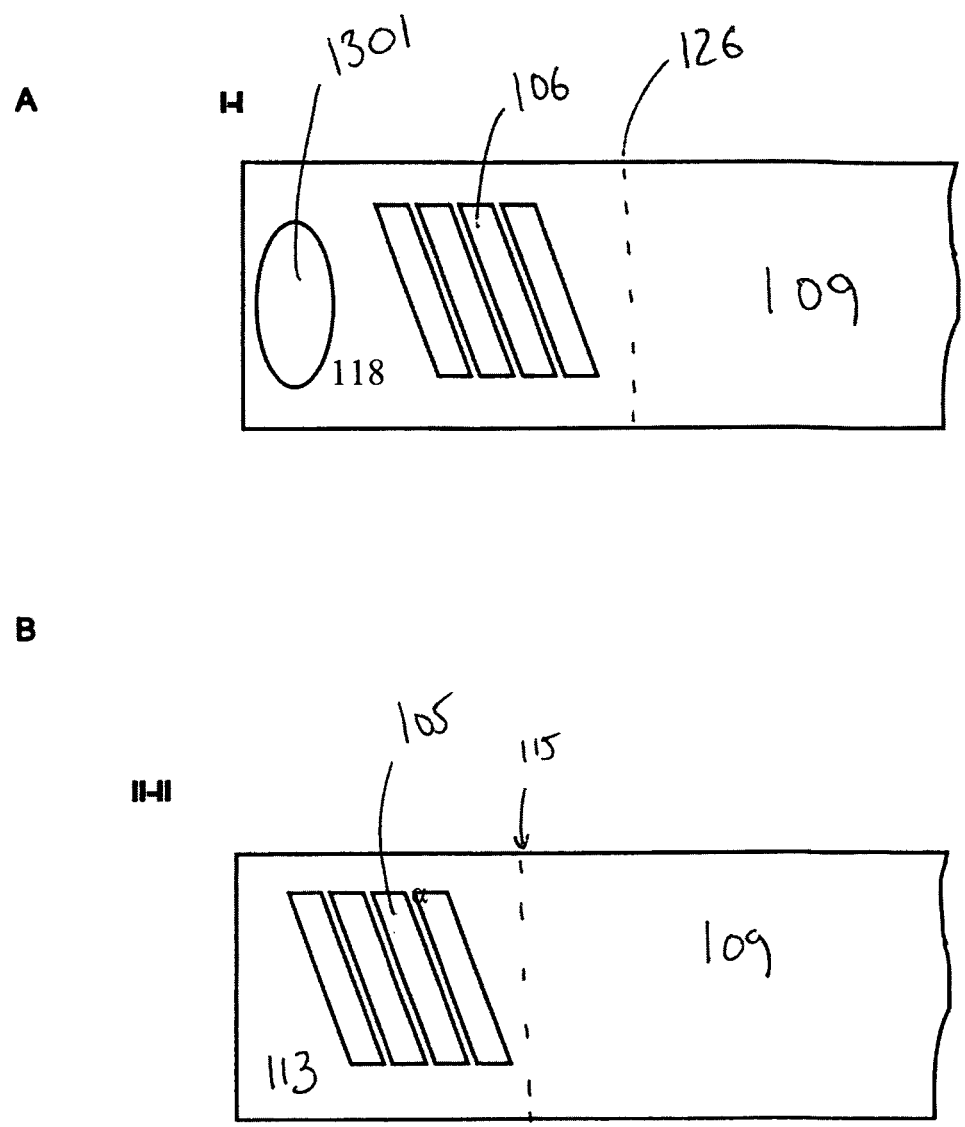
FIG. 13A shows a cross sectional view at I-I of FIG. 12 of an embodiment of the device in which the carrier is in-line with the active area.
FIG. 13B shows a cross sectional view at II-II of FIG. 12 of an embodiment of the device in which the carrier is in-line with the active area.

FIG. 13A shows a cross sectional view at I-I of an embodiment of the device in which the carrier 103 is in-line with the active area 109. Collimated light 1301 is propagating in parallel with the first secondary light redirecting structures 106 (e.g. prisms or diffractive structures). The collimated light propagates in the second part of the third waveguide 118 and the first secondary light redirecting structures 106 are formed in the first part of the third optical waveguide 118. Next to the first secondary light redirecting structures 106 is seen an optical waveguide—active area interface 126 between the third optical waveguide 118 and the active area 109.

FIG. 13B shows a cross sectional view at II-II of an embodiment of the device in which the carrier 103 is in-line with the active area 109. The second primary light redirecting structures 105 (e.g. prisms or diffractive structures) formed in the second optical waveguide 113 are seen next to the optical waveguide—active area interface 115 between the second optical waveguide 113 and the active area 109.

As mentioned above, in case of the carrier 103 being in-line with the active area 109, the active area may be formed in air or in a slab waveguide.

Figure 14:
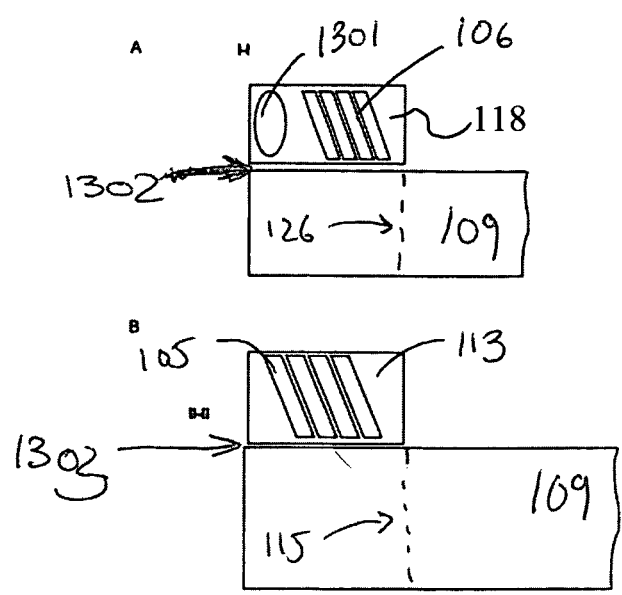
FIG. 14A shows a cross sectional view at I-I of FIG. 12 of an embodiment of the device in which the plane of the carrier 103 is shifted in the Z-direction with respect to the active area 109 plane.
FIG. 14B shows a cross sectional view at II-II of FIG. 12 of an embodiment of the device in which the plane of the carrier 103 is shifted in the Z-direction with respect to the active area 109 plane.

FIG. 14A shows a cross sectional view at I-I of an embodiment of the device in which the plane of the carrier 103 is shifted in the Z-direction with respect to the active area 109 plane. Collimated light 1301 is propagating in parallel with the first secondary light redirecting structures 106 (e.g. prisms or diffractive structures). The collimated light propagates in the second part of the third waveguide 118 and the first secondary light redirecting structures 106 are formed in the first part of the third optical waveguide 118. Below the third optical waveguide 118 is seen a third optical waveguide—slab optical waveguide interface 1302 between the third optical waveguide 118 and the slab waveguide containing the active area 109.

FIG. 14B shows a cross sectional view at II-II of an embodiment of the device in which the plane of the carrier 103 is shifted in the Z-direction with respect to the active area 109 plane of the device. The second primary light redirecting structures 105 (e.g. prisms or diffractive structures) formed in the second optical waveguide 113 are seen next to the second optical waveguide—slab waveguide interface 1303 between the second optical waveguide 113 and the slab waveguide containing the active area 109.

As mentioned above, in case of the carrier 103 plane is shifted with respect to the active area plane, the active area may be formed in a slab waveguide.

Total Internal Reflection

Generally, guidance of light by total internal reflection occurs when light that is incident upon a surface from within the device, e.g. as seen in FIGS. 4-6 and 9-11, has an angle of incidence larger than a critical angle. The angle of incidence of a light beam is defined as the angle between the light beam and a normal (e.g. 402 in FIG. 4) of the surface of incidence.

Likewise a critical angle is defined relative to a normal of the surface of incidence. The critical angle is dependent on a relation between the refractive index of the waveguide 109, 110, 113, 118, 119 and the refractive index of the medium outside the device 100 (ambient medium). A critical angle, $\theta_{c,a}$, is defined by the equation:

$$\theta_{c,a} = \arcsin(n_a/n_w),$$

where $n_a$ is the refractive index of the ambient medium (usually air) and $n_w$ is the refractive index of the waveguide 109, 110, 113, 118, 119. The refractive index for air is under normal conditions approximately 1.

If, at a contact point i.e. a point in which an object such as a finger touches the waveguide of the active area 109 e.g. point 123 of FIG. 1 or point 403 of FIG. 4, the ambient medium is replaced by the object with a refractive index $n_o$, the local critical angle changes accordingly to:

$$\theta_{c,o} = \arcsin(n_o/n_w).$$

Preferably, $\theta_{c,o}$ is larger than $\theta_{c,a}$. This occurs if $n_o$ is larger than $n_a$. If the object is a finger, then $n_o$ is approximately 1.47. Preferably, the angle of incidence of all light beams are controlled to be between the two critical angles $\theta_{c,a}$ and $\theta_{c,o}$. In this case total internal reflection is inhibited exclusively at the contact point resulting in at least part of the light being coupled out of the waveguide. As a result, the intensity of that light beam, detected at the detector 108 will decrease.

If, at another point, the ambient medium is replaced by a drop of water with a refractive index $n_{water}$, the local critical angle changes accordingly to:

$$\theta_{c,water} = \arcsin(n_{water}/n_w).$$

Water has a refractive index of approximately 1.33. Preferably, the angle of incidence of all light beams are controlled to be between the two critical angles $\theta_{c,water}$ and $\theta_{c,o}$ so that total internal reflection is not inhibited by the water drop. In such an embodiment, water residing on the active area waveguide will not affect light propagating within the waveguide. Throughout the present disclosure, the three above-mentioned critical angles are primarily denoted the critical angle $\theta_{c,a}$ of the ambient medium, the critical angle $\theta_{c,o}$ of the object, and the critical angle $\theta_{c,water}$ of water.

The active area waveguide may be made of a number of different materials such as acrylic glass. If the light beams are within the visible range and the touch-sensitive waveguide is made of acrylic glass that has a refractive index of approximately 1.49, then the critical angles are approximately as follows: the critical angle $\theta_{c,a}$ of air is 42°; the critical angle $\theta_{c,water}$ of water is 63.2°; and the critical angle $\theta_{c,o}$ of the object (a finger) is 80.6°.

Determination of Point of Contact

Each light beam reflected from the second primary light redirecting structure and/or from the second secondary light redirecting structure, as defined by its propagation path projected onto the XY-plane, has a unique point of incidence on the first part 116 and/or second part 120 of the detector 108. In the illustrated embodiment, the detector array 108 is one-dimensional for position encoding. However, the detector array 108 may be multiple-dimensional e.g. two-dimensional. By changing the intensity of a light beam propagating along a particular propagation path within active area 109, a changed intensity at the corresponding point of incidence on the detector 108 will occur.

The intensity of a given light beam 124, 404 that is incident upon a specific point of the detector 108, may be decreased by the object 405 (e.g. a finger touching the active area at the point of contact 123, 403) disturbing the light beam 124, 404 at a contact point 123, 403 such that at least a part of the light beam 124, 404 is prevented from being incident upon the specific point of the detector 108 when the object 405 contacts the active area 109. The object 405 contacting the active area means that the object 405 is within the evanescent field of the light in question that is guided by active area 109. The object 405 may disturb a light beam 124, 404 propagating within the slab waveguide 109 e.g. by coupling out at least a part of the light beam 124, 404. Alternatively or additionally, the object 405 may disturb a light beam 124, 404 propagating within the slab waveguide 109 by absorbing at least a part of the light beam 124, 404. Alternatively or additionally, the object 405 may disturb a light beam 124, 404 propagating within the slab waveguide 109 by scattering at least a part of the light beam 124, 404.

Due to the intersecting light beams 121, 122 propagating within the active area 109 which light beams 121, 122 are substantially parallel to the x-axis and the y-axis, respectively, as shown in FIG. 1, it is possible to disturb light propagating in each of these directions at substantially a single contact point 123 by the object (not shown in FIG. 1) contacting the active area 109.

However, light emitted by the light source 101 towards either the first primary light redirecting structure 104 or the first secondary light redirecting structure 106 in the carrier 103 may also be disturbed by the object. Furthermore, light redirected by either the second primary light redirecting structure 105 or the second secondary light redirecting structure 107 towards the detector 108 may also be disturbed by the object. However, by comparing the corresponding change of intensity of light arriving at different respective points of the detector 108, the location of a single contact point may be deduced.

This is illustrated by the exemplified situation shown in FIG. 1, where the object (not shown) is contacting the active area 109 at a contact point 123. Projected onto the XY-plane, two light beams 121, 122 that are guided by the active area 109 are intersecting at the contact point 123. At least a part of the light from each of these two light beams 121, 122 are disturbed by the object (not shown) at the contact point 123. Thus, the light intensity of incident light will decrease at two points at the detector 108. Since the two light beams 121, 122 corresponding to the two points of incidence on the detector 108 have exactly one common point of intersection, i.e. the contact point 123, the position of the contact point 123 may be deduced from the intensity distribution of light detected at the detector 108.

Thus, an embodiment of a device 100 according to the present invention, as illustrated in FIG. 1, comprising a single light source 101 and a single detector 108 may be used for estimating a position of a contact point 123 between the object (not shown) and an active area 109.

Insensitivity Towards Contact Points in the Carrier

In an embodiment, light coupled from the light source 101 into the optical waveguides 110, 118 of the carrier 103 via the collimating element 102 is made with angles of incidence in relation to the optical waveguides 110, 118 that are larger than the critical angle $\theta_{c,o}$ of the object (not shown) so that the light coupled into the optical waveguides 110, 118 is not influenced by the object (not shown). Thereby, the light guided in the first and third optical waveguides 110, 118 are insensitive to the object (not shown) touching carrier 103 during propagation from the light source 101 towards the active area 109.

As disclosed above, when the active area 109 comprises a slab waveguide, then the first primary and first secondary light reflecting structures 104, 106 are inclined/slanted relative to a normal 402 of the active area plane/slab waveguide plane and forms an angle θ with the slab waveguide surface that is approximately 81° i.e. different from 90°. The angle θ may have a different value, such as in the range between 60° and 89°, such as between 70° and 86° or 180° minus any of the mentioned angles or ranges of angles Furthermore, a first primary and a first secondary light redirecting structure 104, 106 may comprise different portions (not shown) which may form different angles with the slab waveguide surface.

The inclination of the first primary and first secondary light reflecting structures 104, 106 with respect to the slab waveguide 109 causes the angles of incidence of the reflected light beams 121, 122 with respect to the slab waveguide surface 109 to form an angle with a normal of the slab waveguide surface 109 that is smaller than the critical angle $\theta_{c,o}$ of the object (not shown) and larger than the critical angle $\theta_{c,a}$ of the ambient medium. Thus, the reflected light beams are guided by the slab waveguide 109 from the first primary light redirecting structure 104 towards the second primary light redirecting structure 105 and from the first secondary light redirecting structure 106 towards the second secondary light redirecting structure 107 by means of total internal reflection at the slab waveguide surface 109 when no object contacts the slab waveguide 109. However, the guided light beams may be disturbed in case the object (not shown) is contacting the slab waveguide surface 109.

Light coupled from the active area 109 into second and fourth optical waveguides 113, 119 of the carrier 103 via the active area/optical waveguide interfaces 115, 125 is made with angles of incidence in relation to the optical waveguides 113, 119 that that is smaller than the critical angle $\theta_{c,o}$ of the object and larger than the critical angle $\theta_{c,a}$ of the ambient medium. In an embodiment, the second primary and secondary light redirecting structures 105, 107 may reflect incident light at an angle larger than the critical angle $\theta_{c,o}$ of the object so that the light coupled into the optical waveguides 113, 119 is not influenced by the object. Thereby, the light guided in the second and fourth optical waveguides 113, 119 are insensitive to the object touching carrier 103 during propagation from the active area 109 to the detector 108.

In an embodiment, the light source 101 may be intensity modulated in order to avoid interference from ambient light such as e.g. sun light. Additionally, the detector 108 may perform gated detection thereby facilitating distinction between ambient light and light emitted by the light source 101.

If the active area 109 comprises a slab waveguide of a medium able to guide light, then the active area may be defined at least partly by the surface of the slab waveguide.

FIG. 4 shows an embodiment of a device comprising slanted prisms 401 coupling light into, respectively receiving light from, an active area comprising a slab waveguide, wherein the slanted prisms are in-line with the active area slab waveguide i.e. the slab waveguide is contained in the same plane as the slanted prisms.

FIGS. 5 and 6 shows embodiments of a device comprising slanted prisms 501, 601 coupling light into, respectively receiving light from, an active area comprising a slab waveguide 502, 602, and wherein the plane of the active area/slab waveguide is displaced in the Z-direction with respect to the plane of the slanted prisms.

Figure 8:
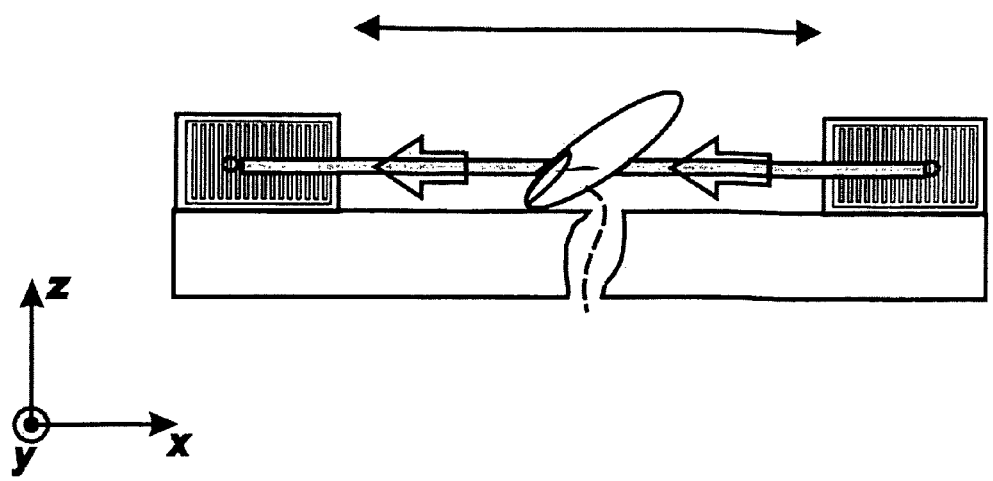
FIG. 8 shows a device for encoding a position of an object comprising the carrier in-line with the active area formed in air and light redirecting structures formed as diffractive structures.

FIG. 7 and FIG. 8 shows an embodiment of a device comprising an active area formed in air. FIG. 7 shows an embodiment in which the light redirecting structures are formed by prisms and FIG. 8 shows an embodiment wherein the light redirecting structures are formed by diffractive structures such as e.g. diffractive reflection gratings or diffractive transmission gratings.

Figure 9:
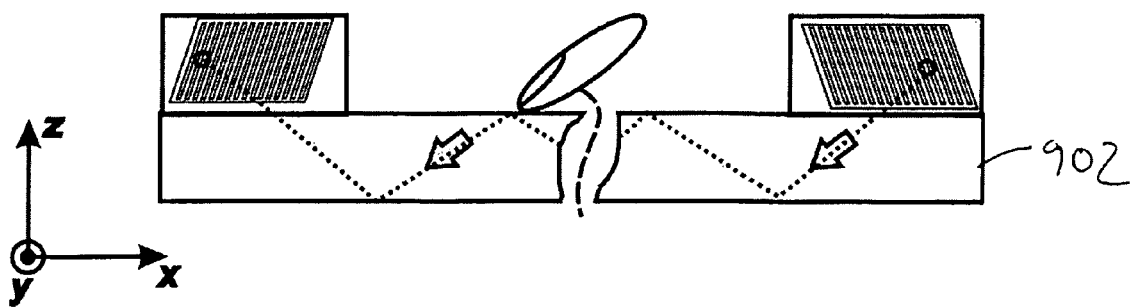
FIG. 9 shows a device for encoding a position of an object comprising the carrier above the active area and light redirecting structures formed as diffractive structures.
Figure 10:
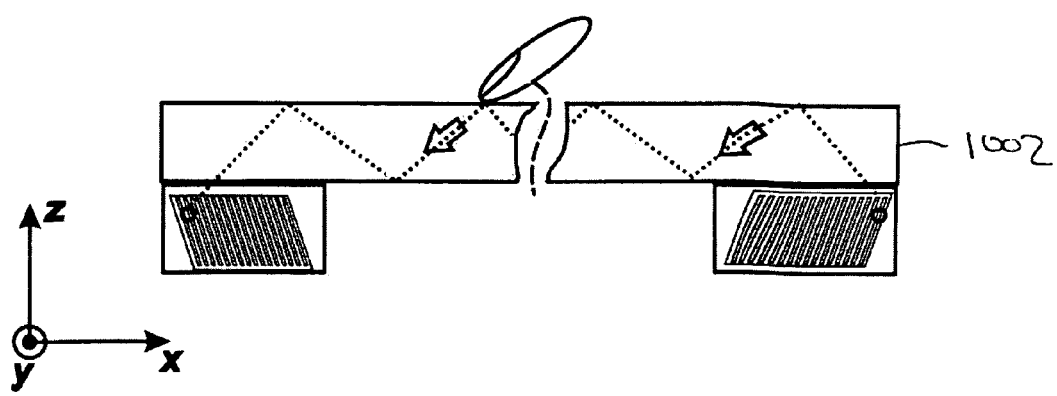
FIG. 10 shows a device for encoding a position of an object comprising the carrier below the active area and light redirecting structures formed as diffractive structures.

FIGS. 9 and 10 shows embodiments of a device comprising slanted diffractive structures such as slanted diffractive transmission gratings and/or slanted diffractive reflection gratings coupling light into, respectively receiving light from, an active area comprising a slab waveguide 902, 1002, and wherein the plane of the active area/slab waveguide is displaced in the Z-direction with respect to the plane of the slanted diffractive structures.

Figure 11:
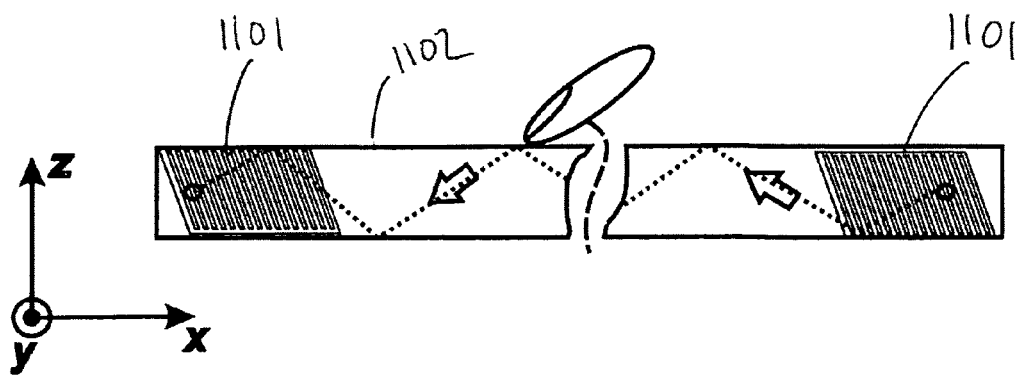
FIG. 11 shows a device for encoding a position of an object comprising the carrier in-line with the active area and light redirecting structures formed as diffractive structures.

FIG. 11 shows an embodiment of a device comprising slanted diffractive structure 1101, such as slanted diffractive transmission gratings and/or slanted diffractive reflection gratings, coupling light into, respectively receiving light from, an active area comprising a slab waveguide 1102, wherein the slanted diffractive structures are in-line with the active area slab waveguide i.e. the slab waveguide is contained in the same plane as the slanted diffractive structures.

In general, any of the technical features and/or embodiments described above and/or below may be combined into one embodiment. Alternatively or additionally any of the technical features and/or embodiments described above and/or below may be in separate embodiments. Alternatively or additionally any of the technical features and/or embodiments described above and/or below may be combined with any number of other technical features and/or embodiments described above and/or below to yield any number of embodiments.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

In the above and the below, like numbers may refer to like elements/technical features.

The invention claimed is:

1. A device for encoding a position of an object, comprising:
    a first light source;
    a first collimating element adapted to form first collimated light from the first light source, the first collimated light comprising a first collimated light beam;
    a carrier adapted to guide the first collimated light, the carrier comprising a first primary light redirecting structure and a second primary light redirecting structure; and
    a detector device for encoding the position of an object with respect to an active area of an encoding plane;
    wherein the first primary light redirecting structure is adapted to redirect at least a part of the first collimated light beam through the active area into the second primary light redirecting structure; and
    wherein the second primary light redirecting structure is adapted to redirect light received from the first primary light redirecting structure onto the detector device.

2. A device according to claim 1, wherein the carrier further comprises a first secondary light redirecting structure and a second secondary light redirecting structure, wherein the first secondary light redirecting structure is adapted to redirect at least a part of a second light beam through the active area into the second secondary light redirecting structure; and wherein the second secondary light redirecting structure is adapted to redirect light received from the first secondary light redirecting structure onto the detector device.

3. A device according to claim 2, comprising a beam splitter structure that is adapted to split at least a part of the first collimated light into the first light beam and the second light beam.

4. A device according to claim 2, comprising a second light source and a second collimating element for forming second collimated light from the second light source, wherein the second light beam comprises at least a part of the second collimated light.

5. A device according to claim 1, wherein the first primary light redirecting structure comprises a prism structure.

6. A device according to claim 5, wherein the prism structure comprises a plurality of prisms including a first prism having a planar surface.

7. A device according to claim 6, wherein a normal to the planar surface of the first prism and the encoding plane form an angle in the range from about 0° to about 15°.

8. A device according to claim 6, wherein the planar surface of the first prism is perpendicular to the encoding plane and forming an angle of incidence with the first light beam, wherein the angle of incidence is in the range from 30° to about 60°.

9. A device according to claim 6, wherein the refractive index of the first prism is less than the refractive index of the carrier.

10. A device according to claim 1, wherein the first primary light redirecting structure comprises a diffractive transmission grating.

11. A device according to claim 1, wherein the first primary light redirecting structure comprises a diffractive reflection grating.

12. A device according to claim 1, wherein the active area is air.

13. A device according to claim 1, comprising a slab waveguide having a first surface area at least partly defining the active area.

14. A device according to claim 13, wherein the slab waveguide and the first and second primary and first and second secondary light redirecting structures are contained in the same plane.

15. A device according to claim 13, wherein the first and second primary and first and second secondary light redirecting structures are contained in a plane displaced from the plane containing the slab waveguide.

16. A device according to claim 2, wherein the carrier further comprises a first mirror and a second mirror; wherein the first mirror is adapted to reflect a part of the first light beam and the second mirror is adapted to reflect a part of the second light beam.

17. A device according to claim 1, wherein the device further comprises a first cylindrical lens positioned in front of the detector for focusing light from the second primary light redirecting structure onto the detector.

18. A device according to claim 5, wherein the prism structure comprises embedded reflectors or the prisms comprises a reflective coating.

19. A device according to anyone of claim 1, wherein the device is adapted to determine the position of an object disturbing light propagating in the active area as a change in received light intensity by the detector.

20. A device according to claim 6, wherein the side-length of a prism in the prism structure is determined as a square-root of the wavelength of the light propagating in the active area multiplied by the length of the side of the active area by which side the plurality of prisms are formed and divided by a factor, wherein the factor is chosen between 3 and 10, preferably 10.

21. A device according to claim 1, wherein the light source is intensity modulated in order to enable suppression of the influence of ambient light.

22. A method of encoding a position of an object, comprising:
    redirecting in a first primary light redirecting structure at least a part of a first collimated light beam received from a light source via a collimating element through an active area and into a second primary light redirecting structure;
    redirecting in the second primary light redirecting structure at least a part of the light received from the first primary light redirecting structure onto a detector device; and
    encoding the position the object with respect to the active area as function of the amount of light received at the detector device.

23. A method according to claim 22, further comprising redirecting in a first secondary light redirecting structure at least a part of a second light beam through an active area and into a second primary light redirecting structure; and redirecting in a second secondary light redirecting structure at least part of the light received from the first secondary light redirecting structure onto the detector device.

24. A method according to claim 22, comprising splitting the first light beam received from the collimating element into the first and the second light beam.

25. A system for encoding a position of an object, the system comprising a device according to claim 1 and an object disturbing light in the active area.

26. A device according to claim 8, wherein the angle of incidence is about 45°.

* * * * *